(No Model.)
J. SNOW.
BELT FASTENER.
No. 409,252. Patented Aug. 20, 1889.
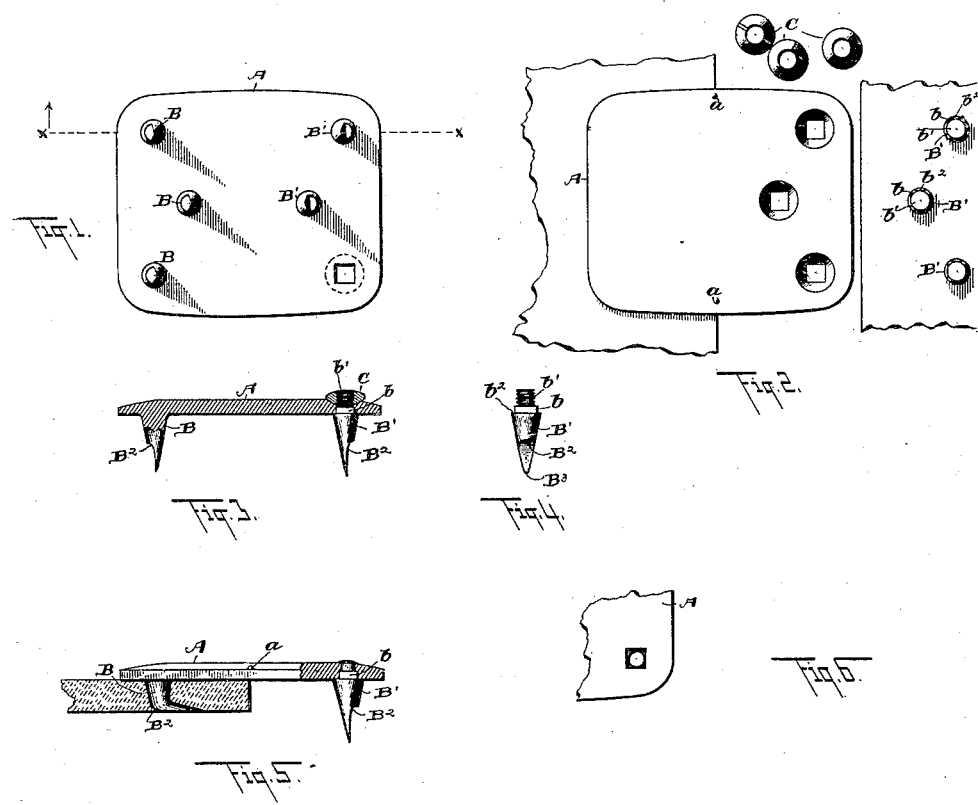
WITNESSES:
N. S. Amstutz
Geo. W. King
James Snow INVENTOR
BY Liggett & Liggett
ATTORNEY

UNITED STATES PATENT OFFICE.

JAMES SNOW, OF CLEVELAND, OHIO, ASSIGNOR TO WILLIAM H. H. PECK AND SARAH E. SNOW, BOTH OF SAME PLACE.

BELT-FASTENER.

SPECIFICATION forming part of Letters Patent No. 409,252, dated August 20, 1889.

Application filed June 21, 1888. Renewed June 13, 1889. Serial No. 314,105. (No model.)

*To all whom it may concern:*

Be it known that I, JAMES SNOW, of Cleveland, in the county of Cuyahoga and State of Ohio, have invented certain new and useful Improvements in Belt-Fasteners; and I do hereby declare the following to be a full, clear, and exact description of the invention, such as will enable others skilled in the art to which it pertains to make and use the same.

My invention relates to belt-fasteners having detachable teeth at the one end thereof, by removing which detachable teeth the belt may be taken apart at the splice, leaving the one end of the belt and its connection with the fastener intact.

My invention also relates to details of construction hereinafter described, and pointed out in the claim.

In the accompanying drawings, Figure 1 is a plan of the face side of the fastener with one tooth removed. Fig. 2 is a plan of the back or reverse side with one end of the belt secured to the fastener. Fig. 3 is an elevation in section on line $x\,x$, Fig. 1. Fig. 4 is an elevation of a tooth detached. Fig. 5 is an elevation, partly in section, showing a riveted tooth. Fig. 6 is a plan of a portion of the back side of plate A.

A represents a metal plate constituting the body of the belt-fastener, the same at the one end thereof having a series of integral teeth B, and at the other end having one or more detachable teeth B′, both sets of teeth projecting from the same side of the plate. The general form of each tooth is conical, with the side of the tooth next the adjacent end of the fastener—that is, on the side of the tooth opposite where the draft of the belt comes—chamfered off, as shown at B², such chamfering commencing, say, a quarter of an inch, more or less, from the bottom or root of the tooth and extending to and cutting away the conical point, leaving a chisel-edge B³ instead of a conical point. The advantages of the chisel-edge are well known, to wit: They make a clean cut through the belt without tearing the fiber thereof, and clinch down easily with the flat side flush and smooth with the surface of the belt, the rounded side of the tooth being embedded in the belt.

The peculiar form of tooth caused by the chamfering commencing part way down the tooth has marked advantages, to wit: The tooth, being left full size at the base and far enough to extend nearly through the belt, is consequently so large and strong at this part that in clinching the tooth is not bent or strained below the chamfer, and consequently there is no liability of the tooth breaking from the plate; also, in clinching the short bend of the tooth approximately at right angles at or near the surface of the belt injures the belt much less than the long bend extending nearly through the thickness of the belt, as is the case where a tooth is not stiff and strong at the base. The detachable teeth B′ have reduced shanks with square sections $b$ and rounded sections $b'$, that fit in corresponding holes of plate A. The shoulder $b^2$ of course abuts the face of the plate when the tooth is in position and fastened. Section $b'$ of the shank may be screw-threaded and have a nut $c$ to hold the tooth in place; or this section of the shank may be riveted in, in which case section $b'$ should only be long enough to extend through the plate and rivet a trifle, as shown in Fig. 5, so that with a punch and a light blow of a hammer the tooth may be driven out of the plate.

It is frequently necessary for various purposes to take the belt apart at the splice, sometimes to take up or shorten the belt, and at other times for other purposes where the belt does not require shortening. The teeth having been clinched, it is difficult or impracticable to withdraw the teeth from the belt without tearing or injuring the latter; but with the teeth detachable from the plate these removable teeth may be punched out in case they have been riveted, or the nuts may be removed in case the teeth are held by nuts, and the one end of the belt having thus been released from the fastener, the teeth may be pushed on through the belt without injuring the latter, in case the belt is not to be taken up. If the belt requires shortening, of course the end having the clinched teeth therein is cut off. In either case, by supplying new teeth to this end of the plate the loose end of the belt may be again fastened. If the belt has been taken up, of course the new teeth puncture new holes in the belt; otherwise the new teeth enter the old holes in the belt.

In making the splice, in the first instance, the two ends of the belt are abutted together and the fastener is placed centrally over the joint and driven down until the teeth pass through the belt and the belt rests firmly against plate A. The teeth are then clinched and hammered down flush with the face of the belt, the teeth in clinching being always bent inward or toward the center line of the belt-fastener.

Points or marks $a$ on the back of plate A serve as guides in placing the plate over the splice or joint of the belt.

What I claim is—

In a belt-fastener, a plate having one or more teeth integral therewith and projecting from one side thereof, and one or more detachable teeth each having an angular portion adapted to be removably secured in an angular opening formed in the plate, the rigid and detachable teeth each having a chamfered side, the said chamfer commencing midway of a tooth and extending to the point thereof, and located on the side of the tooth opposite to where the draft of the belt comes, substantially as set forth.

In testimony whereof I sign this specification, in the presence of two witnesses, this 18th day of April, 1888.

JAMES SNOW.

Witnesses:
CHAS. H. DORER,
ALBERT E. LYNCH.